Figure 1:
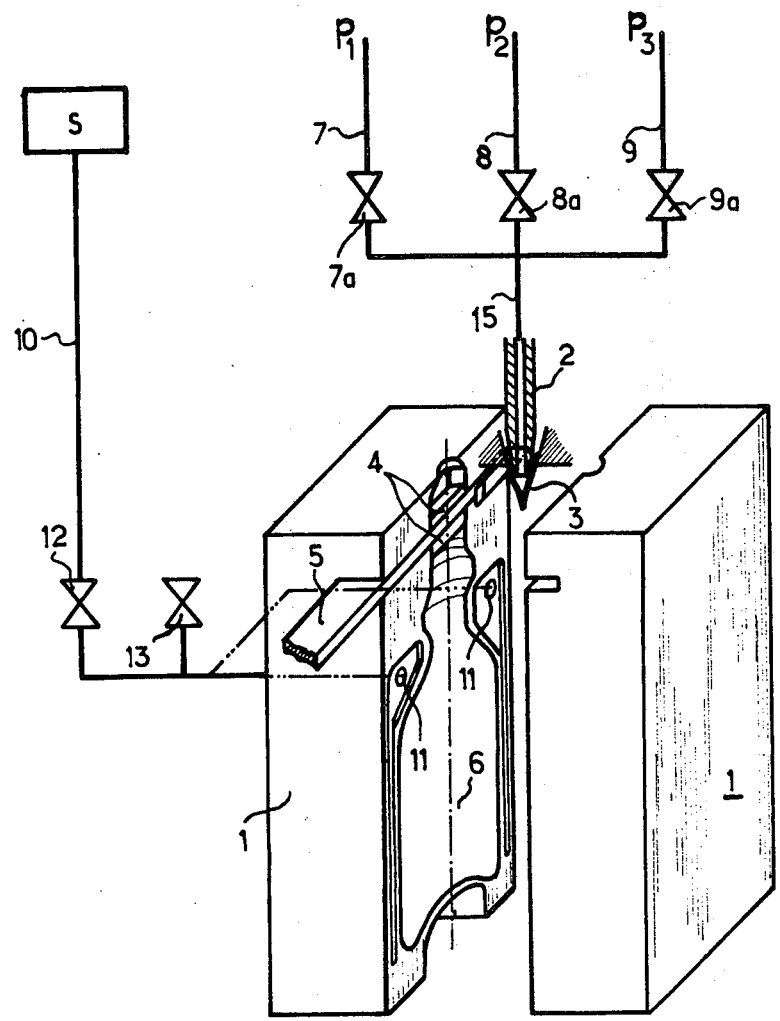

United States Patent [19]

Dardaine et al.

[11] 4,026,982

[45] May 31, 1977

[54] METHOD OF AUTOMATIC MANUFACTURE OF CLOSED, INTERNALLY STERILE HOLLOW BODIES

[75] Inventors: Edgar Dardaine, Sorel-Moussel; Jean-Luc Berry, Mesnil sur l'Estree; Michel Siard, Sainte-Adresse; Daniel Pellerin, le Havre, all of France

[73] Assignee: E. P. Remy & Cie, Dreux, France

[22] Filed: Feb. 26, 1975

[21] Appl. No.: 553,171

[30] Foreign Application Priority Data

Mar. 22, 1974 France .......................... 74.09930

[52] U.S. Cl. .................................. 264/89; 264/90; 264/96; 264/99; 425/DIG. 215
[51] Int. Cl.² ........................................ B29C 17/07
[58] Field of Search ................... 264/89, 90, 92, 94, 264/96, 98, 99, 95; 425/DIG. 207, 208, 215

[56] References Cited

UNITED STATES PATENTS

| | | | |
|---|---|---|---|
| 3,246,062 | 4/1966 | Scott, Jr. et al. | 425/DIG. 208 |
| 3,423,495 | 1/1969 | Bachner | 264/96 |
| 3,619,442 | 11/1971 | Henderson | 264/89 |
| 3,814,783 | 6/1974 | Dardaine et al. | 264/98 X |

FOREIGN PATENTS OR APPLICATIONS 943,573 12/1963 United Kingdom ................. 264/98

*Primary Examiner*—Jan H. Silbaugh
*Attorney, Agent, or Firm*—Kenyon & Kenyon Reilly Carr & Chapin

[57] ABSTRACT

The process of the invention essentially consists in supplying sterile gas to an extruded parison confined between the two shells of a mould, this sterile gas being sequentially applied at a first pressure slightly higher than atmospheric pressure, at a second pressure much higher than the first pressure in order to inflate the parison, and at a third pressure which is much lower than the second pressure and corresponds to the desired inflating pressure of the hollow body to be formed.

4 Claims, 2 Drawing Figures

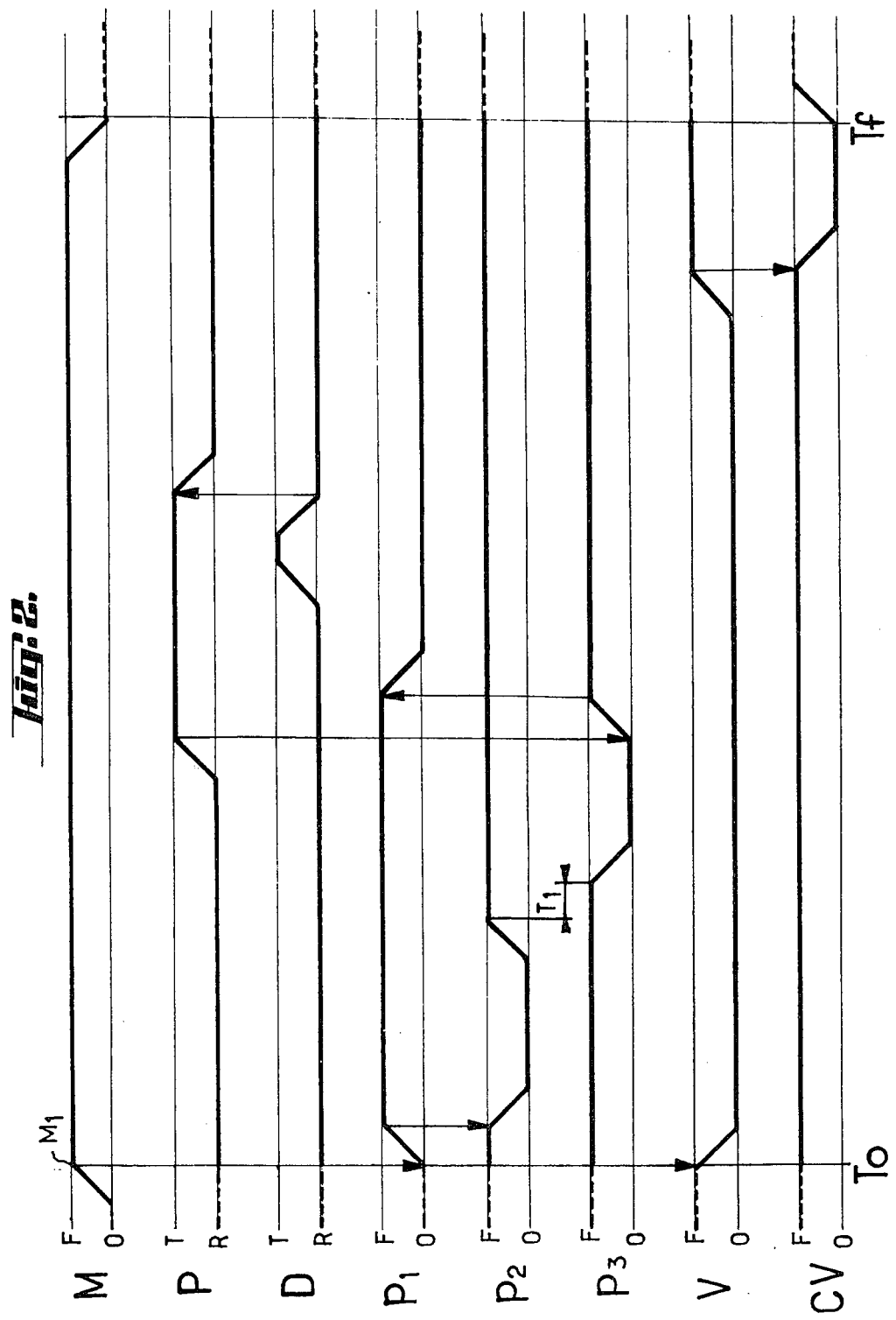

METHOD OF AUTOMATIC MANUFACTURE OF CLOSED, INTERNALLY STERILE HOLLOW BODIES

The present invention has essentially for its object a method of automatic manufacture of sealingly closed, internally sterile hollow bodies, consisting in extruding a heat-weldable plastics material in the form of a continuous tube, forming a parison having one sealingly closed end and another open end connected exclusively with a source of sterile gas, introducing the said parison into a mould, producing in the said parison a certain pressure of sterile gas while at the same time creating a vacuum in the mould outside the parison, sealingly closing the open end of the hollow body thus obtained and the lower portion of the following parison, separating the said hollow body from the following parison and discharging the said hollow body from the mould.

In the presently known methods of this type, such as the one described in the U.S. Pat. Ser. No. 3,814,783 granted on June 4, 1974, in the name of the assignee of the present invention, an extrusion of a blank or parison is performed which is thereafter inflated in a mould by applying vacuum between the said mould and the said blank, whereas a certain amount of sterile gas under low pressure is maintained within the blank in order to avoid its flattening.

Of course, such a method has the advantage that it eliminates the risk of pollution within the hollow bodies after the extrusion. Indeed, should the blank be casually pierced and, consequently, should the sterile gas come into contact with the mould and thus be polluted, the said polluted gas cannot flow back upstream of the sterile gas circuit, for it will be discharged owing to the vacuum. It should also be observed that such a method also permits a non-negligible economy in inflating sterile gas consumption.

It has been found, however, that such a method has two major drawbacks. First, the rate of production of the hollow bodies or containers remains relatively low. Indeed, it is understood that the sucking of the blank wall by the vacuum in order to apply the same on the internal walls of the mould is an operation which requires a rather long time. Secondly, the range of plastics materials used in the methods of the prior art was quite limited, and this might raise many problems in the packaging of particular products.

The present invention remedies the above-mentioned drawbacks by providing a method of manufacture of sealed, internally sterile hollow bodies, which is particularly efficient, permits particularly high production rates and also allows the use of a very wide range of thermoplastic materials without prejudicing in any case the aseptic qualities of the hollow bodies obtained.

More precisely, and according to a first feature of the invention, the sterile gas pressure $p_1$ in the parison is initially maintained only very slightly higher than atmospheric pressure during its introduction into the mould, and then, after applying the vacuum, a sterile gas pressure $p_2$ much higher than pressure $p_1$ and ensuring an almost instantaneous inflation of the said parison and, therefore, the formation of the hollow body, is supplied into the parison; thereafter is applied a sterile gas pressure $p_3$ corresponding to the desired inflating pressure in the container and much lower than the pressure $p_2$, and after closing the open portion of the hollow body the said pressure $p_1$ is thereafter restored in the following parison in order to form another hollow body according to the sequential application of the aforesaid pressures $p_1$, $p_2$ and $p_3$.

Obviously, it is the pressure $p_2$ that ensures the forming of the hollow body, i.e. performs the instantaneous application of the blank or parison against the internal walls of the mould. The hollow body is therefore formed very quickly, i.e. as soon as the sterile gas pressure $p_2$ is applied.

According to another feature of the method of the invention, the aforesaid vacuum is produced as soon as the mould is closed and thus ensures the escape of the gas overpressure penetrating into the parison under pressure $p_2$ in case the said parison is casually pierced.

Consequently, the high-pressure sterile gas having served to form the hollow body in the mould and which may be polluted by the latter in case the parison is casually pierced, is automatically discharged owing to the vacuum and cannot flow back upstream of the die into the sterile gas circuit.

According to still another feature of the invention, the aforesaid pressure $p_3$ is applied only some time after the arrival of sterile gas under pressure $p_2$ is stopped.

It is therefore understood that this period of time advantageously allows all the inflating gas under pressure $p_2$ which may have been polluted by the mould to be discharged owing to the vacuum in case the parison is pierced. Of course, if this should not be the case, pressure $p_2$ and pressure $p_3$ would balance one another during the application of the pressure $p_3$ to the blank.

According to another feature of the invention, the closing of the arrival of sterile gas under the inflating pressure $p_2$ automatically causes, after the aforesaid period of time, the opening of the valve for the balancing of the sterile gas under pressure $p_3$, and the closing of the said valve automatically causes the opening of the arrival of sterile gas under pressure $p_1$ which must reach the following parison.

It should also be noted that, according to the invention, the vacuum in the mould, outside the parison, is maintained all the time during the sequential application of pressures $p_1$, $p_2$ and $p_3$.

According to another feature of the invention, the pressure $p_1$ is on the order of a few centimeters of water head, the pressure $p_2$ is on the order of a few bar and comprised for example between 1 and 5 bar, and the pressure $p_3$ is on the order of several meters of water head.

According to another feature of the invention, the nipping operation resulting in the fluid-tight closing of the open end of the hollow body, i.e. of the formed container, starts before the end of the application of the said pressure $p_3$.

The invention is also directed at a device for carrying out the aforesaid method, the said device being characterized in that the internal space of the parison is permanently connected with a source of sterile gas capable of supplying the said gas under the three aforesaid different pressures $p_1$, $p_2$ and $p_3$ through the medium of three conduits with which automatically controlled valves are respectively associated.

Of course, the mould is connected with a vacuum circuit provided with the necessary valves to either break or restore the said vacuum.

Other purposes and advantages of the invention will appear more clearly from the following detailed description made with reference to the appended drawings given solely by way of example and wherein:

FIG. 1 is a diagrammatic perspective view of a device for carrying out the method according to the invention; and FIG. 2 shows a logic diagram of the operating sequences performed by the said device.

According to an example of embodiment and as seen clearly in FIG. 1, a device for carrying out the method according to the invention comprises essentially: a mould formed of two separable shells, 1, an extrusion die whose head is shown diagrammatically at 2 and which serves to extrude a continuous tube of plastics material illustrated diagrammatically at 3, nipping means 4 for sealingly closing the container after it is formed, a blade 5 for severing the upper portion of the containers after they are formed, and a sterile-gas supply conduit 15 connected permanently with the internal space of the blank or parison 3. At 6 is shown a cavity in the shells 1 of the mould, the said cavity having, in the example illustrated, the shape of a bottle; however, it can of course have any other shape without departing from the scope of the invention.

The above-mentioned arrangements call for no particular commentary, for they are known in the prior art.

As seen clearly in FIG. 1, the sterile gas supply conduit 15 is connected with three lines 7, 8 and 9 serving to supply sterile gas under different pressures $p_2$, $p_2$ and $p_3$ respectively, and each provided with a valve diagrammatized at 7a, 8a and 9a.

At 10 is shown a vacuum circuit 10 connected with a source of vacuum S and communicating at 11 with the internal space of the mould. On the circuit 10 is of course provided at least one valve such as 12, as well as an air-inlet cock 13.

The operation of the device of FIG. 1 will now be described in detail with reference to the diagram of FIG. 2 illustrating the various operating sequences performed by the said device, i.e. the method according to the present invention. In FIG. 2, the letters O and F mean respectively "open" and "closed", whereas the letters T and R mean respectively "work" and "rest". The symbols on the left of the letters O and F and the letters T and R have the following meanings:

M = mould
P = nipping
D = severing
$p_1$ = pressure $p_1$
$p_2$ = pressure $p_2$
$p_3$ = pressure $p_3$
V = vacuum
CV = vacuum broken The sterile-container manufacturing plant according to the invention can be previously made sterile by any known and appropriate thermal means (not shown) and performs cyclically the following operating steps:

a. A blank 3 closed (during the previous cycle) at its lower end is extruded. The internal space of the blank is supplied with sterile gas proceeding from the conduit 7, under pressure $p_1$, the said pressure being constant and very low, e.g. on the order of a few centimeters of water head. Therefore the blank is not inflated. Otherwise stated, its flattening is only avoided.

b. When a sufficient blank length is reached, the extrusion is stopped and the shells 1 of the mould are closed (see FIG. 2, reference letter $M_1$ and reference letter $T_0$ which corresponds to the end of mould closing). Of course, the closed mould retains its relative position with respect to the die 2 so as to preserve the fluid-tightness of the blanks during the whole cycle.

c. The valve 12 is opened to connect the space comprised between the mould and the parison with vacuum circuit.

d. The valve 7a of the constant pressure circuit $p_1$ is closed, thus automatically causing the opening of the valve 8a and connecting the internal space of the parison with a sterile gas under pressure $p_2$ which is much higher than the pressure $p_1$ and may be comprised between about 1 and 5 bar. This operation leads to an immediate shaping and cooling of the blown hollow body.

e. After this operation, the valve 8a is closed.

f. The valve 9a is then opened some time after the valve 8a is closed, as shown at $T_1$ in FIG. 2. The pressure $p_3$ thus admitted is on the order of several meters of water head and is therefore much lower than the pressure $p_2$. It is worth while noting that at this stage the valve 12 connecting the mould with the vacuum circuit is maintained open, as seen in FIG. 2, so that, should a hole and therefore a leak occur in the parison, the time $T_1$ between the closing of the circuit $p_2$ and the opening of the circuit $p_3$ allows the pressure $p_2$ in the mould to be reduced to a value lower than $p_3$, thus preventing any return flow of the polluted gas upstream of the die. Indeed, such a polluted gas would result from the contact of the sterile gas with the mould walls.

g. Thereafter, the nipping means 4 are used to sealingly close the upper portion of the formed hollow body, the said closing simultaneously ensuring the closing of the lower portion of the following parison. At that moment, the container is closed, fluid-tight and filled with sterile gas under the desired pressure $p_3$.

h. The closing of the valve 9a of the $p_3$-pressure circuit 9 causes the opening of the valve 7a of the $p_1$-pressure circuit 7 so as to supply the following parison with sterile gas. The valve 12 for connection with the vacuum circuit is closed and its closing causes the opening of the air-inlet cock or vacuum-breaking valve 13.

i. The upper portion of the closed hollow body is then severed by means of the blade 5 (actuated by means which are not shown) and at such a level that the fluid-tightness can be preserved at the top of the closed hollow body and the bottom of the following blank.

j. The mould is opened and the blown hollow body is ejected. The cycle is thus completed and the device is ready to perform a further cycle.

It should be noted that the nipping operation ensuring the fluid-tight closing of the hollow body begins before the end of the application of the final pressure $p_3$, as seen clearly in FIG. 2 when comparing the diagram lines P and $p_3$.

It is therefore readily inferred from the foregoing that if no vacuum were applied before the opening of the high-pressure circuit $p_2$ and maintained beyond the moment of closing of this same circuit, the sterile gas proceeding from this circuit would fill the whole cavity of the mould, inside as well as outside the pierced parison. The sterile gas would then be polluted by its contact with the mould and would flow back upstream of the extrusion head and pollute the circuit 15 up to the valves 7a, 8a and 9a, as well as the circuit $p_3$, and then the circuit $p_1$ at the beginning of the following cycle. This is avoided owing to the present invention, due to the fact that the vacuum is applied during a period much longer than that of the pressure $p_2$. This means that there is no risk of pollution of the sterile air circuit, which is also due to the fact that, owing to the time $T_1$ between the closing of the valve 8a and the opening of the valve 9a, there is plenty of time for the polluted gas, if any, to flow out through the vacuum circuit.

Lastly, it is readily understood that, owing to the method of the invention, if a container is casually pierced and therefore defective, it can easily be eliminated, for it will not or poorly be inflated, and this will have no prejudicial effect upon the other containers from the point of view of asepsis.

Therefore, the present invention ensures a high rate of production of sealingly closed and absolutely sterile containers, the quality of which is always excellent and which are rigorously aseptic even if the parison should be damaged.

Of course, the invention is not at all limited to the form of embodiment described and illustrated which has been given by way of example only. In particular, it comprises all the means constituting technical equivalents to the means described as well as their combinations, if the latter are carried out according to its gist and used within the scope of the appended claims.

What we claim is:

1. A method for automatically manufacturing sealingly closed and internally sterile hollow bodies in a mold having separable parts that may be moved to open and closed positions, said method comprising extruding a heat-weldable plastic material in the form of a continuous tube having one end which is sealingly closed and its other end which is open and connected exclusively and permanently with a source of sterile gas, introducing said tube as a tubular parison between said parts of the mold in its open position, simultaneously producing in said parison a first pressure of said sterile gas, said first pressure being maintained slightly higher than atmospheric pressure during introduction of the parison in the mold, closing said parts of the mold, creating a vacuum in the mold outside the parison, producing in said parison a second pressure of said sterile gas much higher than said first pressure and providing instantaneous inflation of the parison and therefore the forming of the said hollow body, said vacuum ensuring the escape of the over-pressure of the gas arriving in the parison under said second pressure in case such parison is pierced, then stopping the arrival of sterile gas under said second pressure, producing in the parison a third pressure of said sterile gas corresponding to the desired inflating pressure of the hollow body and being much lower than said second pressure, said third pressure being applied only after a certain period of time from the moment the arrival of sterile gas under said second pressure is stopped, which period of time allows all the inflating gas under said second pressure which may have been polluted by the mould to be discharged by the vacuum, nipping said other open end of the parison before the end of the application of the said third pressure, restoring said first pressure in the following parison in order to form another hollow body according to the sequential application of the aforesaid first, second and third pressures, severing the so formed firstly mentioned hollow body from said following parison, stopping the vacuum application and opening said parts of the mold for ejecting said internally sterile hollow body.

2. A method according to claim 1, wherein the closing of the arrival of gas under said inflating second pressure automatically causes, after the said period of time, the opening of a valve for balancing the sterile gas under said third pressure, and the closing of the said valve automatically causes the opening of the arrival of sterile gas under said first pressure which must reach the following parison.

3. A method according to claim 1 wherein the aforesaid vacuum in the mould outside the parison is maintained all the time during the sequential application of the said second and third pressures.

4. A method according to claim 1, wherein said first pressure is of about a few centimeters of water head, said second pressure is approximately comprised between 1 and 5 bar, and said third pressure is of about several meters of water head.

* * * * *